(12) United States Patent
He

(10) Patent No.: US 10,525,366 B2
(45) Date of Patent: Jan. 7, 2020

(54) ANGULAR MOMENTUM SPINNER

(71) Applicant: Yizong He, Forest Lake, MN (US)

(72) Inventor: Yizong He, Forest Lake, MN (US)

(*) Notice: Subject to any disclaimer, the term of this patent is extended or adjusted under 35 U.S.C. 154(b) by 0 days.

(21) Appl. No.: 15/996,153

(22) Filed: Jun. 1, 2018

(65) Prior Publication Data
US 2019/0366225 A1    Dec. 5, 2019

(51) Int. Cl.
A63H 1/02    (2006.01)
G09B 23/08    (2006.01)

(52) U.S. Cl.
CPC ............. A63H 1/02 (2013.01); G09B 23/08 (2013.01)

(58) Field of Classification Search
CPC ... A63H 1/02; A63H 1/00; A63H 1/04; A63H 1/06; A63H 1/12; A63H 1/18; A63H 1/28; G09B 23/08
See application file for complete search history.

(56) References Cited

U.S. PATENT DOCUMENTS

| | | | | | |
|---|---|---|---|---|---|
| 547,764 | A | * | 10/1895 | Boyum | A63F 9/16 446/256 |
| 755,446 | A | * | 3/1904 | Butcher | A63H 1/00 446/233 |
| 1,334,873 | A | * | 3/1920 | Lytle | A63H 1/04 446/263 |
| 1,646,278 | A | * | 10/1927 | Drauden | A63G 1/08 472/7 |
| 1,780,547 | A | * | 11/1930 | Alland | A63F 9/16 273/145 C |
| 2,078,729 | A | * | 4/1937 | Lemoine | G09B 23/10 446/233 |
| 3,365,835 | A | * | 1/1968 | Grow | A63H 33/00 446/233 |
| 3,623,239 | A | * | 11/1971 | Maslokovets | G09B 23/20 434/300 |
| 3,693,286 | A | * | 9/1972 | Marcotti | A63F 7/382 446/266 |
| 3,855,725 | A | * | 12/1974 | Tollefson | A63H 1/08 446/132 |
| 4,643,692 | A | * | 2/1987 | Magers | A63H 1/20 446/236 |
| 6,221,409 | B1 | * | 4/2001 | Bueno Ceresuela | A23G 3/50 426/104 |
| 6,364,734 | B1 | * | 4/2002 | Ng | A63H 1/00 446/236 |
| 6,612,895 | B2 | * | 9/2003 | Sze | A63H 1/00 446/233 |
| 6,666,452 | B1 | * | 12/2003 | Kielar | A63H 1/00 273/138.1 |
| 9,950,556 | B1 | * | 4/2018 | Laemle | B43K 29/00 |
| 2017/0326468 | A1 | * | 11/2017 | Kinmont, Jr. | A63H 33/26 |
| 2018/0353868 | A1 | * | 12/2018 | Albert | A63H 1/18 |

* cited by examiner

Primary Examiner — Melba Bumgarner
Assistant Examiner — Amir A Klayman
(74) Attorney, Agent, or Firm — Chen Yoshimura LLP

(57) ABSTRACT

An angular momentum spinner includes two or more rotating arms loaded with an adjustable sliding block for each arm and laid symmetrically about a rotating center. Each sliding block is controlled to move along the corresponding rotating arm. Such a spinner can display the conservation of angular momentum vividly and intuitively, and can also serve as an amusing toy for children. The spinner can be used as teaching equipment for various students to demonstrate the theorem of angular momentum conveniently, intuitively and amusingly.

10 Claims, 2 Drawing Sheets

ANGULAR MOMENTUM SPINNER

BACKGROUND OF THE INVENTION

Field of the Invention

This invention relates to toys and teaching apparatus.

Description of Related Art

In 1993, Catherine Hettinger was unable to play with her seven-year-old daughter due to myasthenia gravis, so she designed a Fidget Spinner serving as a distracting toy. It is comprised of a ball bearing from which three rotating arms stretch symmetrically. Nevertheless the Fidget Spinner was ignored for more than ten years until 2005. After 2005 small manufacturers started making various spinners with all kinds of shapes and colors, and marketed them as therapeutic aids for kids with anxiety, helping them relieve stress and better focus on the task at hand. Today millions of elementary to senior high school students regard fidget spinners as their favorite toys. The advantage of the fidget spinner is simplicity of structure, making manufacturing easy. On the other hand, the structure is so simple making to function monotonous, rotating only with decreasing speed due to the force of friction.

A common way to demonstrate the theorem of angular momentum is to rotate a man sitting on a swivel chair, who stretches out and draws back his hands holding a pair of dumbbells. The revolving speed of both man and chair will change as the distance of the dumbbells with respect to the rotating center changes. This is a common way adopted by many universities to demonstrate the theorem of angular momentum and the law of conservation of angular momentum. Obviously, it is, in some ways, cumbersome and inconvenient.

SUMMARY

Accordingly, the present invention concerns an angular momentum spinner comprised mainly of two ball bearings and two or more rotating arms with a sliding block for each arm. Such a spinner combines both the function of the existing fidget spinner and the function of regulating revolving speed with ease, which demonstrates skillfully the theorem of angular momentum and the law of conservation of angular momentum.

A ball bearing is defined as some small metal balls placed between the moving parts of a machine to make to parts move smoothly.

It is necessary to introduce the theorem of angular momentum in order to appreciate the principle of regulating revolving speed. The theorem states that the rate of change of the angular momentum of a particle around some point O equals the torque on the particle, with respect to O: namely $d(r \times mv)/dt = r \times F$. Thus the angular momentum of a particle $r \times mv$ is conserved if and only if the net external torque $r \times F$ acting on a particle is zero.

If the torque equals to zero, the angular momentum with respect to O remains constant, which is referred to as the law of conservation of angular momentum. When radius r decreases, the speed v goes up correspondingly, and vice versa. In addition to the function of existing fidget spinners, the angular momentum spinner can adjust r conveniently; therefore, the revolving speed can be regulated easily, demonstrating the law of conservation of angular momentum intuitively and vividly.

To achieve both functions of a fidget spinner and the teaching apparatus to demonstrate the theorem of angular momentum, the present invention provides an angular momentum spinner, which includes: a pedestal; a base ball bearing disposed on the pedestal, the base ball bearing having an inner ring fixedly mounter to the cylindrical pedestal and an outer ring configured to rotate relative to the inner ring; a lifter spring which passes through the base ball bearing and is connected at one end to a center region of the cylindrical pedestal; a lifter ball bearing disposed concentrically above the base ball bearing, the lifter ball bearing having an inner ring connected to another end of the lifter spring and an outer ring configured to rotate relative to the inner ring of the lifter ball bearing; and two or more arm assemblies joined to the outer ring of the base ball bearing, each arm assembly including: a rotating arm joined to the outer ring of the base ball bearing and extending in a radial direction; a sliding block disposed on and radially slidable along the rotating arm; a grooved track roller having a groove on its outer surface, the grooved track roller being mounted on the rotating arm and disposed adjacent to the outer ring of the lifter ball bearing; and a connecting wire connecting the sliding block to the outer ring of the lifter ball bearing, the connecting wire being disposed in the groove of the grooved track roller, wherein the connecting wire is configured to pull the sliding block along the rotating arm as the lifter ball bearing is pressed downward by compressing the lifter spring; wherein the two or more arm assemblies are distributed evenly in an angular direction around the base ball bearing.

In some embodiments, in each arm assembly, the rotating arm includes a base plate and a roof plate connected together forming a frame structure extending in the radial direction, wherein the sliding block is disposed between the base plate and the roof plate and includes two ball bearing rollers connected by a connector, each ball bearing roller being configured to roll against the base plate or the roof plate, wherein one of the base plate and the roof plate has two ridges parallel to the radial direction and extending toward the other one of the base plate and the roof plate, the two ridges configured to restrain sideways movement of the two ball bearing rollers.

After rotating arms are driven to move, the revolving motion can last for a period of time, because of the small friction force due to the use of a ball bearing. Pressing the lifter ball bearing down causes the revolving speed to go up accordingly. Conversely, ceasing to press the lifter ball bearing makes the revolving radius increase, resulting in the revolving speed decreasing linearly, obeying the law of conservation of angular momentum.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 1:
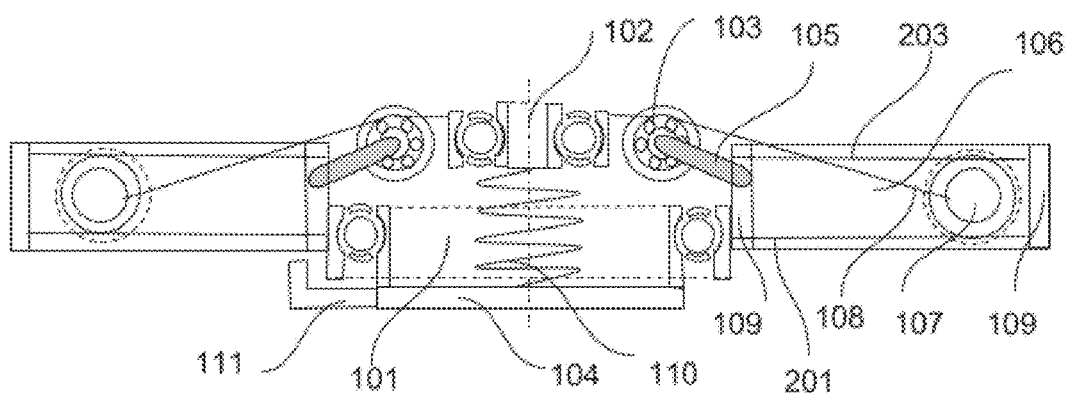
FIG. 1 shows a cross-sectional view of an angular momentum spinner according to an embodiment of the present invention.

FIG. 1 illustrates a cross-section of an angular momentum spinner. A base ball bearing 101 and lifter ball bearing 102 are disposed concentrically. The inner ring of the base ball bearing is fixedly mounted to a cylindrical pedestal 104. The inner ring of the lifter ball bearing 102 is restrained to the cylindrical pedestal 104 by lifter spring 110, which passes through the space of the inner ring of the base ball bearing 101 and is connected at one end to a central region of the cylindrical pedestal 104 and at the other end to the lifter ball bearing 102. A post 111 is installed on the edge of the cylindrical pedestal 104 in order to form a gap for a soft spline to drive the rotating arms 106 shown in FIG. 4.

The outer ring of the base ball bearing 101 is connected to a number of rigid rotating arms 106. In the top view (viewed along a direction parallel to the rotating axis), the rotating arms 106 extend radially, and are distributed evenly (symmetrically) in the angular direction around the base ball bearing 101. In the side view (FIG. 1), the rotating arms 106 preferably extend in a direction perpendicular to the rotation axis of the base ball bearing 101.

For each rotating arm 106, a steel connecting wire 108 is bound to the outer ring of the lifter ball bearing 102 and pulls a sliding block 107 when the lifter ball bearing 102 is moved downwards. The steel connecting wire 108 sits astride a U-groove track roller 103 which is connected to the rotating arm 106 by fastening arm 105. In the uncompressed state of the lifter spring 110, the lifter ball bearing 102 is at approximately the same height of the U-groove track rollers 103. Each rotating arm 106 has a corresponding sliding block 107 which slides back and forth along the rotating arm 106 by pressing and releasing the lifter ball bearing 102.

Each rotating arm 106, sliding block 107, fastening arm 105, U-groove track roller 103 and wire 108 form an arm assembly, and all arm assemblies are identical.

After the rotating arms are kicked off to revolve by the soft spline 303 or by hand, based on the theorem of angular momentum, all the rotating arms start to revolve and whose speed can be regulated continuously by making the lifter ball bearing 102 move up and down thereby causing the sliding blocks 107 to slide along the corresponding rotating arms 106.

Figure 2:
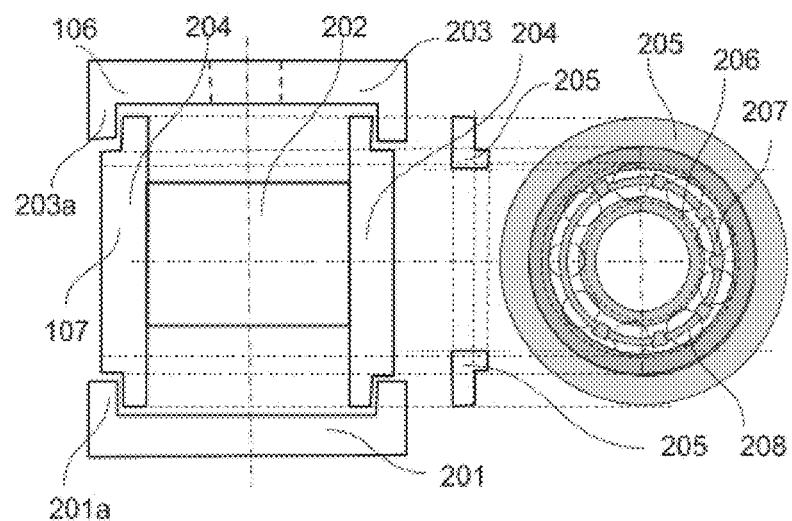
FIG. 2 shows a front and side cross-sectional views of the rotating arm and ball bearing for the sliding block of the spinner of FIG. 1.

FIG. 2 are cross-sectional views of the rotating arm 106 and sliding block 107. The view on the left is viewed along the radial direction of the spinner (i.e. the left-right direction of FIG. 1), and the view on the right is viewed in the same direction as in FIG. 1. The rotating arm 106 includes a pedestal or base plate 201 and a roof plate 203 connected together forming a frame structure, both having an elongated shape extending in the radial direction of the spinner. The sliding block 107 includes two identical ball bearing rollers 204 connected by a cylindrical connector 202. Preferably, the base 201 has a pair of ridges 201a extending toward the roof 203, and the roof 203 has a corresponding pair of ridges 203a extending toward the base 201. The ridges 201a and 203a function to constrain the two ball bearing rollers 204 of the sliding block 107 and prevent the sliding block 107 from falling out of the spaced defined between the base 201 and roof 203. The two ball bearing rollers 204 act as wheels that roll along the base 201. Under gravity, the wheels 204 preferably rest on and roll along the base 201 while being slightly spaced apart from the roof 203, but it is also possible that when pulled upwards by the wire 108, the wheels 204 may roll along the roof 203 while being slightly spaced apart from the base 201. Either way, the sliding block 107 (the wheels 204 and connector 202) can smoothly move along the arm 106 in the radial direction of the spinner.

In the illustrated embodiment, the outer ring 205 of each ball bearings 204 has a step shape, i.e., in the view on the left of FIG. 2, it has a part with a smaller diameter, disposed between the ridges 201a and 203a, and a part with a larger diameter, disposed between the base 201 and the roof 203 and between the ridges 201a and 203a. This step shape is not essential. For example, the outer ring 205 may have the larger diameter in its entire width (no step), and the wheels are entirely disposed between the two ridges 201a of the base 201 and between the two ridges 203a of the roof. Or, the wheels 204 may be disposed outside of the two ridges 201a of the base 201 as well as outside of the two ridges 203a and roof 203. Each of these alternative structures is configured to restrain sideways movement of the wheels 204 and prevent them from moving sideways and falling out of the arm 106. In yet another embodiment, no wheels are used for the sliding blocks 107; the blocks 107 directly contact the base 201 or roof 203 and slide along them. In such an embodiment, the surfaces of the sliding blocks 107 and the arm 106 that contact each other are made of low friction materials such as certain plastics. The cross-section of ball bearing 204 illustrates an outer ring 205 and inner ring 206, separator 207 and steel balls 208.

Also, the two ends of rotating arm 106 are blocked by rectangular plates 109 to prevent the sliding block from falling out of the rotating arm 106. Pressing and releasing the lifter ball bearing 102, the sliding block 107 moves back and forth along the pedestal of rotating arm 201 between the two rectangular plates 109. A rectangular window is carved out from roof 203 of rotating arm 106 so that the connecting wire 108 can connect the sliding block 107 and outer ring of the lifter ball bearing 102.

Figure 3A:
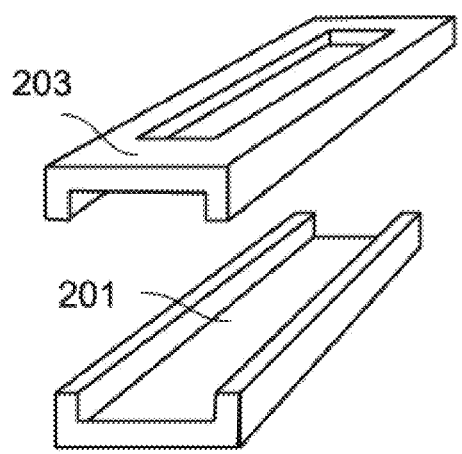
FIG. 3A shows a perspective view of parts of the rotating arm of the spinner of FIG. 1.
Figure 3B:
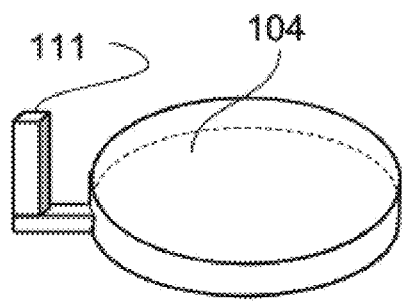
FIG. 3B shows a perspective view of the cylindrical pedestal of the spinner of FIG. 1 with a post to limit the range of motion of a soft spline to drive rotating arms.

FIG. 3A shows the perspective view of the rotating arm 106 including U-like pedestal 201 of rotating arm 106, U-like roof 203 of rotating arm 106. FIG. 3B illustrates the cylindrical pedestal 104 with the post 111 for constraining the movement of a soft spline 303. The pedestal 201 of the rotating arm 106 is a U-like groove track and the roof of rotating arm is also U-like but with a rectangular window carved.

Figure 4A:
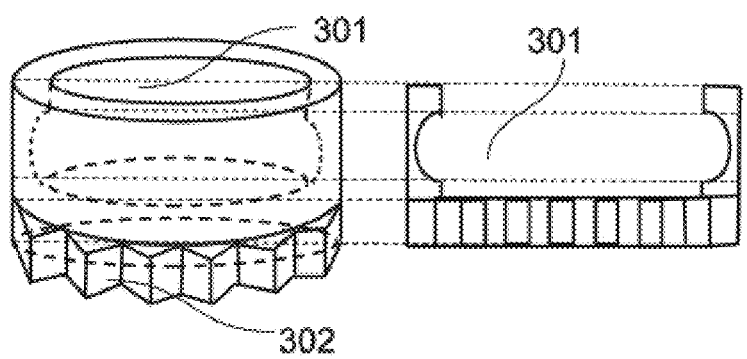
FIG. 4A shows perspective and cross-sectional views of the outer ring of the base bearing of the spinner of FIG. 1.
Figure 4B:
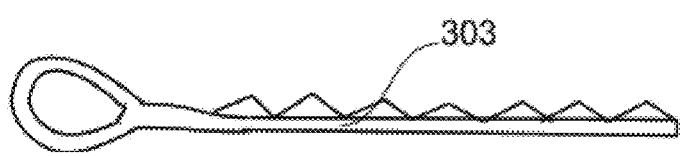
FIG. 4B shows a side view of a soft spline to revolve the rotating arms.

FIG. 4A illustrates the structure of outer ring 301 of the base ball bearing 101. A spline 302 (a set of teeth) is provided on a section of the outer surface of the outer ring 301 of the base ball bearing 101 which can be used for revolving the rotating arm 106 by winding a soft spline 303 around it and then pulling the soft spline quickly. The soft spline 303 (FIG. 4B) is a flexible band with a set of teeth that mate with the teeth of the spline 302 on the outer surface of the base ball bearing 101. In use, the soft spline 303 is inserted and goes through the gap between the outer ring 302 and the post 111 located at the edge of the base ball bearing 101 and wound around the spline 302 of the outer ring 301 of the base ball bearing 101, and then pulled quickly to cause the outer ring of the base ball bearing 101 to rotate.

An angular momentum spinner serves as both a toy for entertaining students and a teaching apparatus to demonstrate the theorem of angular momentum at universities.

It is necessary to introduce the theorem of angular momentum in order to appreciate the principle of regulating revolving speed. Consider a particle of mass m, moving with velocity vector v relative to some inertial frame. A point of reference in the coordinate frame is denoted O. The particle has the momentum mv relative to the inertial frame. We define the angular momentum L relative to O as m r×v. The cross symbol × between two vectors describes the vector cross product. The product r×F is called the torque on the particle with respect to the point O. Based on the above, the theorem states that the rate of change of the angular momentum of a particle around some point O equals the torque on the particle, with respect to O: namely d(r×mv)/dt=r×F. If the net external torque on the particle is zero, then d(r×mv)/dt=O. Integrating both sides gets r×mv=C. Thus the angular momentum of a particle is conserved if and only if the net external torque acting on a particle is zero, namely the law of conservation of angular momentum.

The principle of regulating revolving speed can be described by the following formulas: exert force F to the lifter ball bearing 102, r×F=0 because the direction of radius vector r and force F are always either parallel or antiparallel. Therefore, the motion of sliding block obeys the law of conservation of angular momentum $mv_2 r_2 - mv_1 r_1 = 0$. The relationship between net force to press 102, work done to sliding block denoted W, rotating speed v of sliding block and the radius r can be express as following equations:

$$mv_2 r_2 = mv_1 r_1 \qquad \text{Eq. (1)}$$

$$\int_{r1}^{r2} F \cdot dr = \frac{1}{2}mv_2^2 - \frac{1}{2}mv_1^2 \qquad \text{Eq. (2)}$$

$$W = \frac{1}{2}mv_2^2 - \frac{1}{2}mv_1^2 = \frac{1}{2}mv_1^2[(r_1^2/r_2^2) - 1] > 0 \qquad \text{Eq. (3)}$$

where the sliding block moves from initial position $r_1$ to final $r_2$ ($r_1 > r_2$). When ceasing to press the lifter ball bearing 102, F=0, the lifter ball bearing 102 goes up to initial position due to the lifter spring action and the centrifugal force of sliding block. Pressing and then releasing causes the sliding block to move back and forth until the rotating speed decreases to zero due to the small friction force though.

It will be apparent to those skilled in the art that various modification and variations can be made in the angular momentum spinner of the present invention without departing from the spirit or scope of the invention. Thus, it is intended that the present invention cover modifications and variations that come within the scope of the appended claims and their equivalents.

What is claimed is:

1. An angular momentum spinner comprising:
   a pedestal;
   a base ball bearing disposed on the pedestal, the base ball bearing having an inner ring fixedly mounted to the pedestal and an outer ring configured to rotate relative to the inner ring;
   a lifter spring which passes through the base ball bearing, wherein the lifter spring has a first end and a second end and is connected at the first end to a center region of the pedestal;
   a lifter ball bearing disposed concentrically above the base ball bearing, the lifter ball bearing having an inner ring connected to the second end of the lifter spring and an outer ring configured to rotate relative to the inner ring of the lifter ball bearing; and
   two or more arm assemblies joined to the outer ring of the base ball bearing, each arm assembly comprising:
      a rotating arm joined to the outer ring of the base ball bearing and extending in a radial direction;
      a sliding block disposed on and radially slidable along the rotating arm;
      a grooved track roller having a groove on its outer surface, the grooved track roller being mounted on the rotating arm and disposed adjacent to the outer ring of the lifter ball bearing; and
      a connecting wire connecting the sliding block to the outer ring of the lifter ball bearing, the connecting wire being disposed in the groove of the grooved track roller, wherein the connecting wire is configured to pull the sliding block along the rotating arm as the lifter ball bearing is pressed downward by compressing the lifter spring;
   wherein the two or more arm assemblies are distributed evenly in an angular direction around the base ball bearing.

2. The angular momentum spinner of claim 1, wherein the pedestal has a cylindrical shape.

3. The angular momentum spinner of claim 1, wherein each rotating arm extends in a direction perpendicular to a rotation axis of the outer ring of the base ball bearing.

4. The angular momentum spinner of claim 1, wherein each arm assembly further comprises a fastening arm configured to mount the grooved track roller to the rotating arm.

5. The angular momentum spinner of claim 1, wherein in each arm assembly, the rotating arm includes a base plate and a roof plate connected together forming a frame structure extending in the radial direction, wherein the sliding block is disposed between the base plate and the roof plate and includes two ball bearing rollers connected by a connector, each ball bearing roller being configured to roll against the base plate or the roof plate, wherein one of the base plate and the roof plate has two ridges parallel to the radial direction and extending toward the other one of the base plate and the roof plate, the two ridges configured to restrain sideways movement of the two ball bearing rollers.

6. The angular momentum spinner of claim 5, wherein the roof plate defines a window, and wherein the connecting wire passes through the window.

7. The angular momentum spinner of claim 1, further comprising a post fixedly connected to the pedestal, disposed at a distance from an outer surface of the outer ring of the base ball bearing defining a space there between.

8. The angular momentum spinner of claim 7, wherein at least a part of an outer surface of the outer ring of the base ball bearing has a spline shape.

9. The angular momentum spinner of claim 8, further comprising a soft spline configured to be wound around the spline shape of the outer surface of the outer ring of the base ball bearing and pass through the space between the outer surface of the outer ring of the base ball bearing and the post.

10. The angular momentum spinner of claim 1, wherein the pedestal, the base ball bearing, the lifter ball bearing, the rotating arms, the sliding blocks, and the grooved track roller are made of rigid materials.

* * * * *